(12) United States Patent
Johns

(10) Patent No.: US 12,290,211 B2
(45) Date of Patent: May 6, 2025

(54) EGGSHELL EXTRACTION IMPLEMENT

(71) Applicant: Chase Johns, Springville, UT (US)

(72) Inventor: Chase Johns, Springville, UT (US)

( * ) Notice: Subject to any disclaimer, the term of this patent is extended or adjusted under 35 U.S.C. 154(b) by 390 days.

(21) Appl. No.: 17/976,799

(22) Filed: Oct. 29, 2022

(65) Prior Publication Data
US 2023/0048339 A1 Feb. 16, 2023

Related U.S. Application Data

(63) Continuation-in-part of application No. 16/902,021, filed on Jun. 15, 2020, now abandoned.

(51) Int. Cl.
A47J 43/14 (2006.01)
(52) U.S. Cl.
CPC ............ A47J 43/14 (2013.01); A47J 43/145 (2013.01)
(58) Field of Classification Search
CPC ................................ A47J 43/14; A47J 43/145
USPC ........................................................ 30/120.2
See application file for complete search history.

(56) References Cited

U.S. PATENT DOCUMENTS

| | | | | |
|---|---|---|---|---|
| 1,759,512 A | * | 5/1930 | Kramer | A47J 43/14 99/500 |
| 1,870,741 A | * | 8/1932 | Nastrom | A47J 43/14 99/582 |
| 1,883,529 A | * | 10/1932 | Buckwalter | A47J 43/26 30/120.2 |
| 2,000,472 A | * | 5/1935 | Muzzio | A47J 43/14 99/499 |
| 2,212,502 A | * | 8/1940 | Leahey | A47J 43/14 D7/667 |
| 2,314,741 A | * | 3/1943 | Sigler | A47J 43/14 99/582 |
| 2,382,737 A | * | 8/1945 | Mink | A47J 43/14 99/493 |
| 2,521,552 A | * | 9/1950 | Thompson | A47J 43/26 99/581 |
| 2,612,921 A | * | 10/1952 | Tomola | A47J 43/14 99/582 |
| 2,706,507 A | * | 4/1955 | Bartell | A47J 43/14 30/367 |
| 2,752,966 A | * | 7/1956 | Kisner | A47G 19/28 D7/693 |
| 2,990,863 A | * | 7/1961 | Pantermoller | A47J 43/14 452/144 |
| 3,036,610 A | * | 5/1962 | Goodloe | A47G 19/28 D7/696 |
| 3,058,501 A | * | 10/1962 | Kirkland | A47J 43/14 99/500 |
| 3,116,770 A | * | 1/1964 | Tanuma | B26D 3/26 D7/693 |
| 3,152,627 A | * | 10/1964 | Janic, Jr. | A47J 43/14 D7/693 |
| 3,164,180 A | * | 1/1965 | Leopoldi | A47J 43/14 D7/696 |
| 3,307,600 A | * | 3/1967 | Fuge | A47J 43/14 D7/693 |
| 3,338,280 A | * | 8/1967 | Christiansen | A47J 43/14 D7/693 |

(Continued)

Primary Examiner — Sean M Michalski
(74) Attorney, Agent, or Firm — Steven Rinehart

(57) ABSTRACT

An eggshell extraction implement comprising two hingedly-connected working arms and a basket, wherein the basket is used to scoop eggshells (shell fragments) from egg material in a pan.

9 Claims, 4 Drawing Sheets

(56) References Cited

U.S. PATENT DOCUMENTS

| | | | | |
|---|---|---|---|---|
| 3,456,703 A * | 7/1969 | Begue | A47J 43/14 | 99/495 |
| 3,698,458 A * | 10/1972 | Hill | A47J 43/14 | 99/538 |
| 3,717,088 A * | 2/1973 | Urbonas | A47J 37/10 | 99/574 |
| 3,857,327 A * | 12/1974 | Popeil | A47J 43/14 | 99/499 |
| 4,068,573 A * | 1/1978 | Romero | A47J 43/14 | D7/693 |
| 4,095,339 A * | 6/1978 | Turner | B26D 3/185 | 30/304 |
| 4,157,707 A * | 6/1979 | Schwind | A47J 27/58 | 220/4.03 |
| 4,542,584 A * | 9/1985 | Talbot | A47J 43/14 | 99/496 |
| 4,852,256 A * | 8/1989 | Schoettler | B26B 3/04 | 99/537 |
| 4,937,938 A * | 7/1990 | Koo | B26D 1/553 | 30/304 |
| 4,969,268 A * | 11/1990 | Kelly, III | A47J 43/288 | 294/7 |
| 5,167,070 A * | 12/1992 | Hirzel | A47G 21/023 | 30/322 |
| 5,566,452 A * | 10/1996 | Sample | A47J 43/26 | 30/120.2 |
| 5,596,807 A * | 1/1997 | Carr | A47G 21/061 | 30/120.5 |
| 5,673,711 A * | 10/1997 | Andrews | B26B 21/00 | 132/214 |
| 5,903,982 A * | 5/1999 | Gibson | B26B 29/063 | 30/282 |
| 6,135,017 A * | 10/2000 | Wang | A23J 1/09 | 99/497 |
| 6,234,070 B1 * | 5/2001 | Hutchison | A47J 43/145 | 99/581 |
| 6,279,232 B1 * | 8/2001 | Cho | A47J 43/14 | 30/120.5 |
| 7,037,094 B1 * | 5/2006 | Lee | A47J 9/001 | 222/391 |
| 7,383,619 B2 * | 6/2008 | Gross | A46B 5/02 | 15/167.1 |
| 7,654,197 B2 * | 2/2010 | Knusel | A47J 19/06 | 100/234 |
| 7,882,641 B2 * | 2/2011 | Repac | B26D 7/2614 | 83/167 |
| 7,975,389 B2 * | 7/2011 | Bozikis | B26B 21/522 | 30/32 |
| 8,261,372 B2 * | 9/2012 | Drab | A63B 71/146 | 2/161.3 |
| 9,101,240 B2 * | 8/2015 | Lee | A47J 19/06 | |
| 9,415,500 B2 * | 8/2016 | Billado, Jr. | B25G 1/102 | |
| 9,635,868 B1 * | 5/2017 | Douglas | A22C 29/028 | |
| 10,792,827 B2 * | 10/2020 | Treu | B26B 21/521 | |
| 2002/0092430 A1 * | 7/2002 | Dempsey | A47J 43/286 | 100/234 |
| 2002/0138931 A1 * | 10/2002 | Davies | A46B 5/02 | 15/167.1 |
| 2004/0200748 A1 * | 10/2004 | Klassen | A61C 17/3418 | 15/23 |
| 2004/0217533 A1 * | 11/2004 | Mok | A47J 47/005 | 269/289 R |
| 2005/0081385 A1 * | 4/2005 | Ho | A47J 43/281 | 30/325 |
| 2006/0111033 A1 * | 5/2006 | Tomek | B07B 4/08 | 454/1 |
| 2007/0101871 A1 * | 5/2007 | Patterson | A47J 43/14 | 99/495 |
| 2008/0160145 A1 * | 7/2008 | Dolub | A47J 43/14 | 99/582 |
| 2008/0229586 A1 * | 9/2008 | Knepfle | A22C 29/024 | 30/165 |
| 2009/0107347 A1 * | 4/2009 | Vassallo | A47J 43/14 | 99/495 |
| 2011/0094106 A1 * | 4/2011 | Kling | B26B 19/3853 | 30/34.1 |
| 2012/0008454 A1 * | 1/2012 | Grigori | A47J 43/1087 | 366/129 |
| 2012/0125210 A1 * | 5/2012 | Myoung | A47J 43/14 | 99/497 |
| 2013/0097874 A1 * | 4/2013 | Jessen | A47J 43/26 | 30/120.2 |
| 2014/0342063 A1 * | 11/2014 | Heinrich | A47J 43/285 | 426/298 |

* cited by examiner

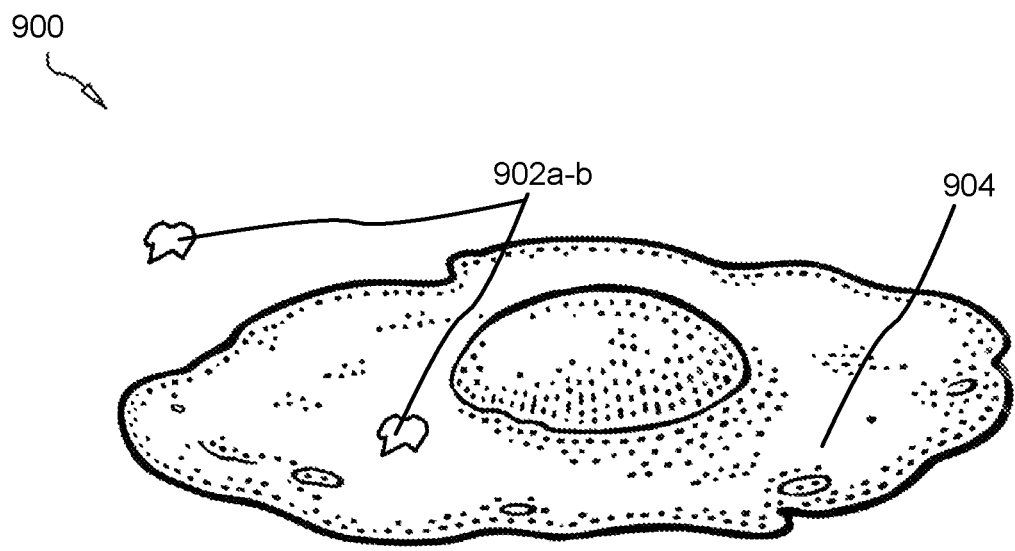
FIG. 9
(Prior Art)
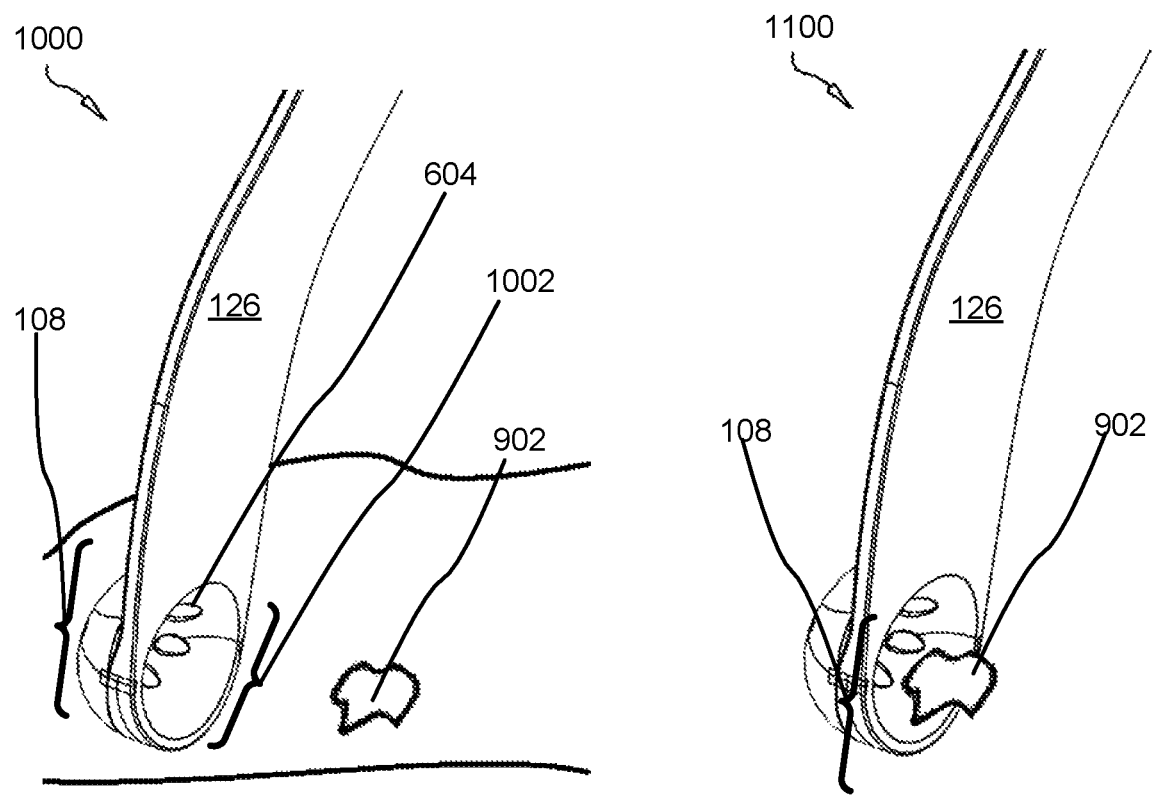
FIG. 10
FIG. 11

EGGSHELL EXTRACTION IMPLEMENT

BACKGROUND OF THE INVENTION

Field of the Invention

This invention relates to kitchen utensils and more particularly relates to a handheld implement adapted to cleanly remove shells from raw egg yolks in a pan.

Description of the Related Art

Cracking and removing eggshells while cooking is time-consuming and problematic. The eggs do not crack cleanly, even when struck on the edges of pots and pans, leaving pieces of the shells in the raw yolks to be consumed. Feeding a group or even small family can require numerous eggs, sometimes with each member of the group eating multiple eggs. In addition to the primary problems relating to simple extraction of the eggshell from the yolks, mixing the yolk with exterior surfaces of the eggshells can be unsanitary, particularly in Europe and outside of the United States where eggs are not required to undergo exterior washing and sanitization before sale. The use of hands or other utensils to extract shells from cracked egg yolks can introduce further issues with contaminants of food products, and breaking cracked yolks to remove egg shells can cause additional aesthetic quality problems with the presentation of food products.

The problems with shelling eggs extend beyond the residential environment. Commercial cooks at diners and restaurants across the world are often obligated to crack and cook more than one hundred eggs during a shift.

There exists a need in the art to remove shells from raw eggs in a pan. Thus, it is desirable to provide an implement which can be easily adapted and used to remove egg shells from a pan.

SUMMARY OF THE INVENTION

From the foregoing discussion, it should be apparent that a need exists for an egg shelling implement. Beneficially, such a system would overcome many of the difficulties of the prior art by providing a shelling implement which works efficiently. The present invention has been developed in response to the present state of the art, and in particular, in response to the problems and needs in the art that have not yet been fully solved by currently available apparati and methods. Accordingly, the present invention has been developed to provide an egg fragment extraction implement operable to remove shell fragments from egg material in a pan comprising: an elongated, upper working arm hingedly affixed at a medial connection-point to an elongated lower working arm, the upper working arm having: a distal portion extending laterally from the medial connection point, and a proximal portion extending laterally from the medial connection point away from the distal portion; the lower working arm affixed at the medial connection point to the upper working arm, the lower working comprising a concave basket adapted to receive an egg, the lower working arm having: a distal portion extending laterally from the medial connection point, the distal portion affixed to the concave basket, and a proximal portion extending laterally from the medial connection point away from the distal portion; the concave basket formed as a single integrated piece with the lower working arm, the concave basket affixed to the lower working arm comprising a concave lower surface defining a plurality of ovoid apertures between two millimeters and 25 millimeters wide through which egg material may be strained; wherein the concave basket is adapted to scoop shell fragments from egg material; wherein the upper working arm is operable to close over an open top end of the basket.

The distal portions of each of the upper arm and the lower arm may be wavy from a side perspective view.

The lower working arm and concave basket may be formed as a single integrated piece. The upper working arm and the lower working arm may be formed of one of: a rigid metal alloy and a rigid polymeric material.

The plurality of apertures may be between two millimeters and seven millimeters in radius width.

The upper working arm may comprise a hinge portion defining a bore through which a bolt traverses. In various embodiments, each of the upper working arm and the lower working arm define a slot for receiving the hinge portion of a hingedly-connected working arm.

The basket may descend inferiorly from the lower working arm. The top surface of the distal portion of the upper working arm comprises a plurality of protuberances spaced at even intervals across the top surface having superiorly rising flanges and defining a bore.

A top surface of the proximal portion of the lower working arm comprises a plurality of protuberances spaced at even intervals across the top surface having superiorly rising annular flanges and defining a bore.

The distal portions of the upper working arm and the lower working arm may be capable of being forced together to apply compressive force to the egg and crack the egg within the concave basket and to force whites and yolk from the apertures defined by the lower concave surface of the basket.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a top perspective view of an eggshell in the egg material in a pan in accordance with the prior art;

FIG. 10 is a top perspective view of a working arm of an egg extraction implement in accordance with the present invention; and FIG. 11 is a top perspective view of a working arm of an egg extraction implement in accordance with the present invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
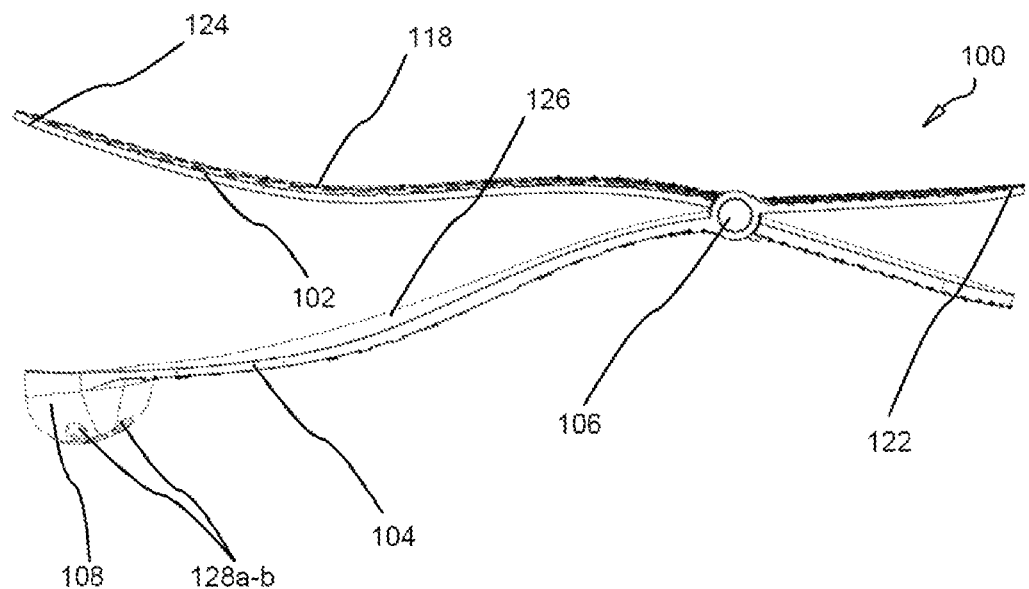
FIG. 1 is a side perspective view of an egg extraction implement in accordance with the present invention.
Figure 2:
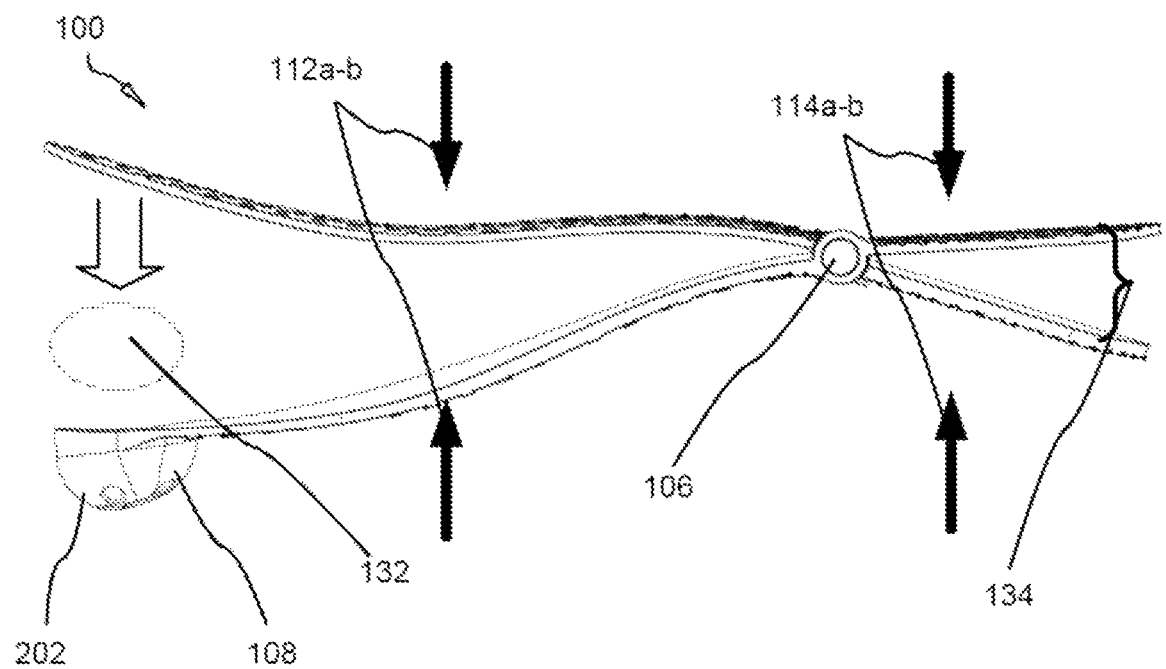
FIG. 2 is a side perspective view of an egg extraction implement in accordance with the present invention.

FIGS. 1 and 2 depict a side perspective view of an egg shelling implement 100 in accordance with the present invention.

The implement 100 comprises an elongated top working arm 102 and an elongated lower working arm 104. Both the top working arm 102 and the lower working arm 104 are S-shaped, wavy, or curved from a side perspective view.

The top working arm 102 and the lower working arm 104 are hingedly connected at a median point 106. The arms 102, 104 articulate about one another at the median point 106. The arms 102, 104 are hingedly affixed to one another in such a manner that the arms 102, 104 axially rotate about the median point 106 on a longitudinal plane intersecting the arms 102, 104 from a distal end 124 to a proximal end 122.

The proximal portion 122 (i.e., end) of the arms 102, 104 comprises the portions of the arms jutting laterally to the shown right of the median point 106. The proximal portion 122 of each arm 102, 104 is substantially planar across a top surface and bottom surface of the proximal portion 122.

The distal portion 124 (i.e., end) of the arms 102, 104 is wavy, with each distal portion of the arms 102, 104 adapted to contour one another when the implement/apparatus 100 in a closed position (i.e., when the distal portions of each arm 102, 104 are pushed into contact with one another). The implement 100 as shown is in a open configuration. The distal portion 124 and the proximal portion extend from the median point 106 in diametrically opposed directions.

The top surface 126 of the lower arm 104 is planar from forward side-to-side (and wavy, or S-shaped, from left to right). The top surface 118 of the top/upper arm 102 comprising a plurality of protuberances 604 (further described below).

The distal end 124 of the lower arm 104 comprises a basket 108, or cup 108, adapted to receive and partially envelop a raw egg 132. The basket 108 is concave as shown, and descends interiorly from the lower arm 104 such that the basket suspends the center of gravity of the egg 132 beneath the top surface 126 of the lower arm 104.

The proximal portions 122 are substantially flat from a side perspective view instead of wavy or S-shaped.

The basket 108 defines a plurality of apertures 128 on its lower concave surface 202. The basket 108 may be dimensioned to receive mesolecithal and/or macrolecithal eggs, or eggs of a specific size of species, such as eggs by way of example from a chicken, quail, goose or ostrich. In typical embodiments, the egg 132 is prolate spheroid in shape.

In various embodiments, the basket 108 is formed as a single integrated piece with the lower working arm 104. Alternatively, the basket 108 may be formed of flexible, polymeric components, such as nylon straps.

The apertures 128 are dimensioned to have radi of sufficient width to allow through passage of the white and yolks of the egg 132, but not the shell of the egg 132.

The arms 102, 104 are closed once the egg 132 is received into the basket 108. The compressive forces between the arms 102, 104 crush the egg 132 within the basket 108 and these compressive forces then force the white (i.e., glair) and yolk interiorly from the basket 108 such that white and yolk are deposited onto a dish or container positioned beneath the implement 100.

Because the white and yolk of the egg 132 are viscous, but fluid, the white and yolk of the egg 132 can be forced from the basket 108 through compression while the shell of the egg 132 remains behind.

Figure 3:
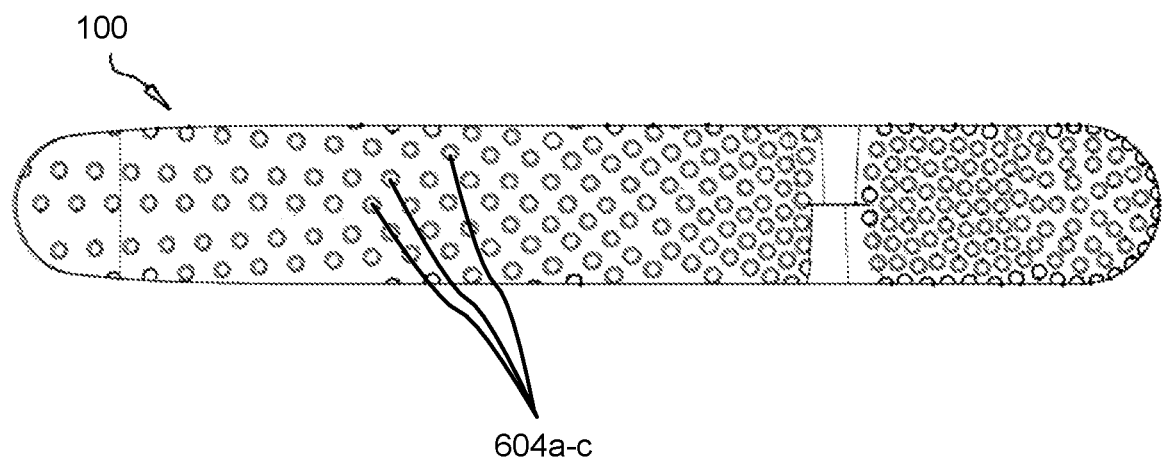
FIG. 3 is a top perspective view of an egg extraction implement in accordance with the present invention.

FIG. 3 is a top perspective view of an egg shelling implement 600 in accordance with the present invention.

A plurality of protuberances 604 space across the top surface 118 (approximately across the x and z axes) of the implement 100. The protuberances 604 comprise annular flanges protuberating from the top surface 118 and comprises bores, or recesses, within the flanges. These protuberances 604 are adapted to help form friction fits with an operator's hands and to relieve pressure from an egg 132 beneath the protuberances 604. The protuberances 604 may be spaced at even intervals across the top surface 118 or may be staggered, or otherwise patterned in their placement across the top surface 118.

The lower working arm 104 and the upper working arm 102 may be fabricated of rigid polymeric components, such as fiberglass. Additionally or alternatively, the upper and lower working arms 102, 104 may be fabricated of a metal or metal alloy, such as steel, aluminum, brass or titanium. Alternatively, the upper and lower arms 102, 104 may fabricated of organic materials, such as wood, resin or leather.

Figure 4:
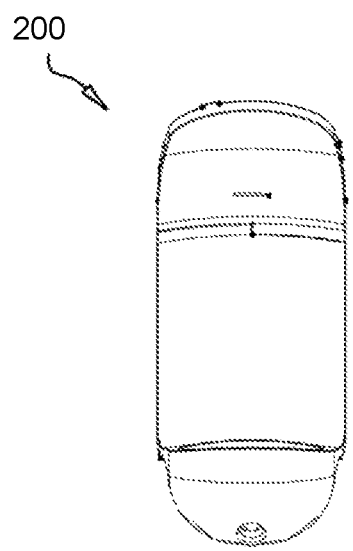
FIG. 4 is a forward perspective view of an egg extraction implement in accordance with the present invention.

FIG. 4 is a forward perspective view of an egg shelling implement in accordance with the present invention.

As shown.

Figure 5:
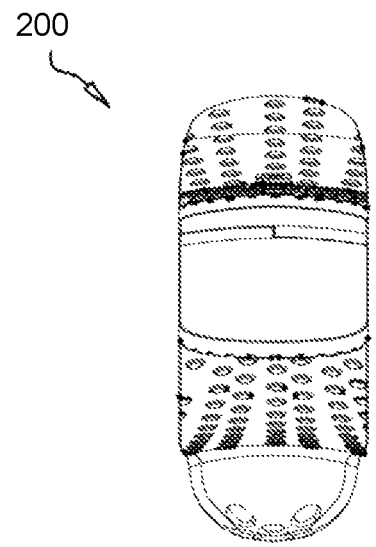
FIG. 5 is a rearward perspective view of an egg extraction implement in accordance with the present invention.

FIG. 5 is a rearward perspective view of an egg shelling implement in accordance with the present invention.

As shown.

Figure 6:
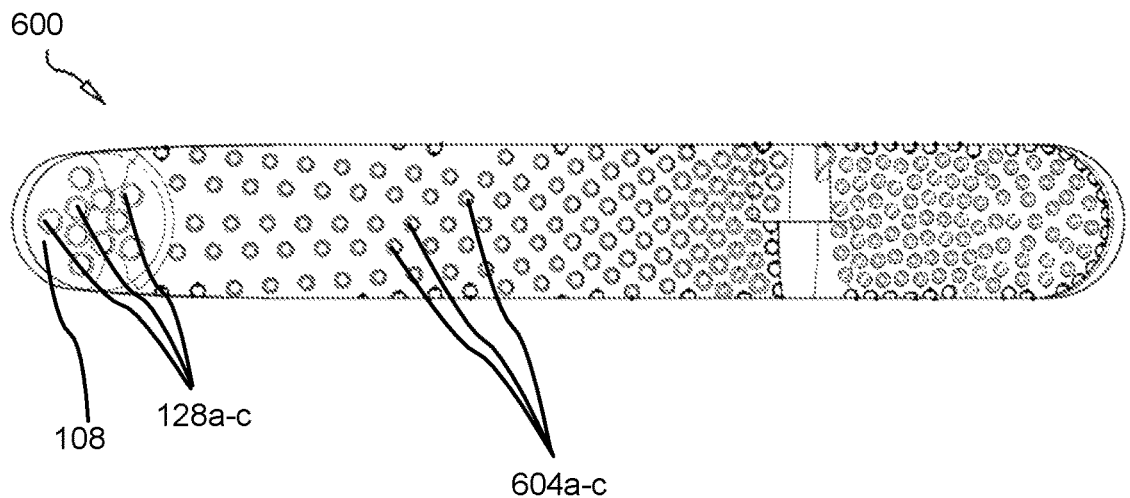
FIG. 6 is a lower perspective view of an egg extraction implement in accordance with the present invention.

FIG. 6 is a lower perspective view of an egg shelling implement 100 in accordance with the present invention.

The lower concave surface of the basket 108 comprises nine apertures 128 in the shown embodiment. These apertures 128 may vary in radius width from two millimeters to 25 millimeters. Although all of the apertures 128 in the shown embodiment are of equal size, in various other embodiments the apertures 128 may vary in size, such that there are smaller apertures 128a between two millimeters and five millimeters in radius and larger apertures 128b greater than five millimeters in width.

The lower arm 104 also comprises protuberances 604 as shown. The bores in these protuberances are smaller in radius width than the radius width of the apertures 128 of the basket 108.

Figure 7:
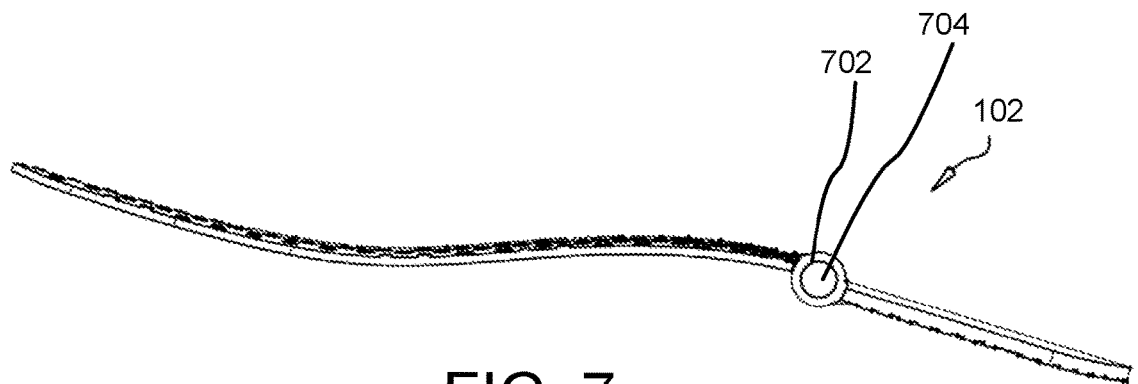
FIG. 7 is a side perspective view of a working arm of an egg extraction implement in accordance with the present invention.

FIG. 7 is a side perspective view of a working arm 102 of an egg shelling implement in accordance with the present invention.

The working arm 102 comprises a hinge portion 702 defining a hollow bore 704 traversing the arm 102. In various embodiments, a screw, bolt, or even cantilevering protuberance from the arm 104 in inserted into the bore 704 to hingedly affix the arm 102 to the arm 104.

Figure 8:
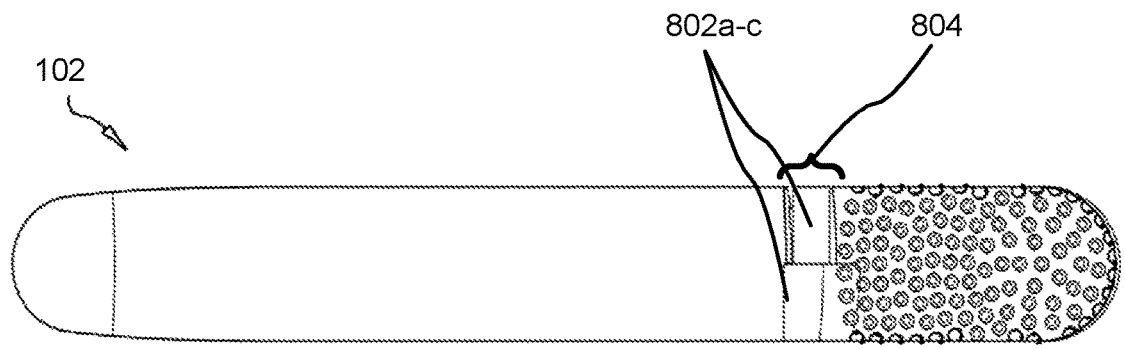
FIG. 8 is a top perspective view of a working arm of an egg extraction implement in accordance with the present invention.

FIG. 8 is a top perspective view of a working arm 102 of an egg shelling implement in accordance with the present invention.

The arm 102 defines a slot 804, or recess, which receives the hinge portion 702 of a hingedly-affixed arm 104. The proximal portion 122 of the arm 102 comprises protuberances 604 on the top surface while the top surface 118 of the distal portion 124 is smooth.

FIG. 9 is a top perspective view of an eggshell in the egg material in a pan 900 in accordance with the prior art.

The egg material 904 may comprise the yolk (or vitellus), protoplasm, deutoplasm, egg white (i.e., albumen), or viscous material which falls from a broken, shelled or cracked egg.

Often, when a egg 132 is cracked, and the egg material 904 dispensed into a pan, shell fragments 902 are mixed with the egg material 904 and need to be removed.

FIGS. 10-11 illustrate perspective views of a working lower arm of an egg extraction implement 1000, 1100 in accordance with the present invention.

The egg extraction implement 1000 comprises the apparati 100-600 previously shown and described. In various embodiments, the apertures 604 are ovoid as shown and may be spaced at even intervals around a circumference of the basket 108.

The basket 108 may be used to scoop up the shell fragments 902 from the egg material 904. The upper arm 102 is closed down over the basket 108, fully enveloping the open top end of the basket 108.

The shell fragments 902 are kept within the basket 108 while the egg material 904 runs out of the apertures 604 (or is "strained" from the apertures 604). The implement 1000 is used to scoop the fragments 902 from the egg material.

The connection point between the upper arm 102 and the lower arm 104 may be disposed within the middle third of the length of the upper arm 102 and termed the medial connection point.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An egg fragment extraction implement operable to remove shell fragments from egg material in a pan comprising: an elongated, upper working arm hingedly affixed at a medial connection point to an elongated lower working arm, the upper working arm having: a distal portion extending laterally from the medial connection point, and a proximal portion extending laterally from the medial connection point away from the distal portion; the lower working arm affixed at the medial connection point to the upper working arm, the lower working comprising a concave basket adapted to receive an egg, the lower working arm having: a distal portion extending laterally from the medial connection point, the distal portion affixed to the concave basket, and a proximal portion extending laterally from the medial connection point away from the distal portion; the concave basket formed as a single integrated piece with the lower working arm, the concave basket affixed to the lower working arm comprising a concave lower surface defining a plurality of ovoid apertures between two millimeters and 25 millimeters wide through which egg material may be strained;

wherein the concave basket is formed of a flexible polymeric material and is adapted to scoop shell fragments from egg material; wherein the upper working arm is operable to close over an open top end of the basket wherein a top surface of the proximal portion of the lower working arm comprises a plurality of protuberances spaced at even intervals across the top surface having superiorly rising annular-flanges and defining a bore; and wherein the distal portions of the upper working arm and the lower working arm are capable of being forced together to apply compressive force to the egg and crack the egg within the concave basket and to force whites and yolk from the apertures defined by the lower concave surface of the basket.

2. The implement of claim 1, wherein the distal portions of each of the upper arm and the lower arm are wavy from a side perspective view.

3. The implement of claim 1, wherein the lower working arm and concave basket are formed as a single integrated piece.

4. The implement of claim 1, wherein the upper working arm and the lower working arm are formed of one of: a rigid metal alloy and a rigid polymeric material.

5. The implement of claim 1, wherein the plurality of apertures are between two millimeters and seven millimeters in radius width.

6. The implement of claim 1, wherein upper working arm comprises a hinge portion defining a bore through which a bolt traverses.

7. The implement of claim 6, wherein each of the upper working arm and the lower working arm define a slot for receiving the hinge portion of a hingedly-connected working arm.

8. The implement of claim 1, wherein the basket descends inferiorly from the lower working arm.

9. The implement of claim 1, wherein a top surface of the distal portion of the upper working arm comprises a plurality of protuberances spaced at even intervals across the top surface having superiorly rising flanges and defining a bore.

* * * * *